Dec. 25, 1934.  A. B. BEITMAN  1,985,560
WINDSHIELD FOR AUTOMOBILES
Filed Nov. 13, 1931  2 Sheets-Sheet 1
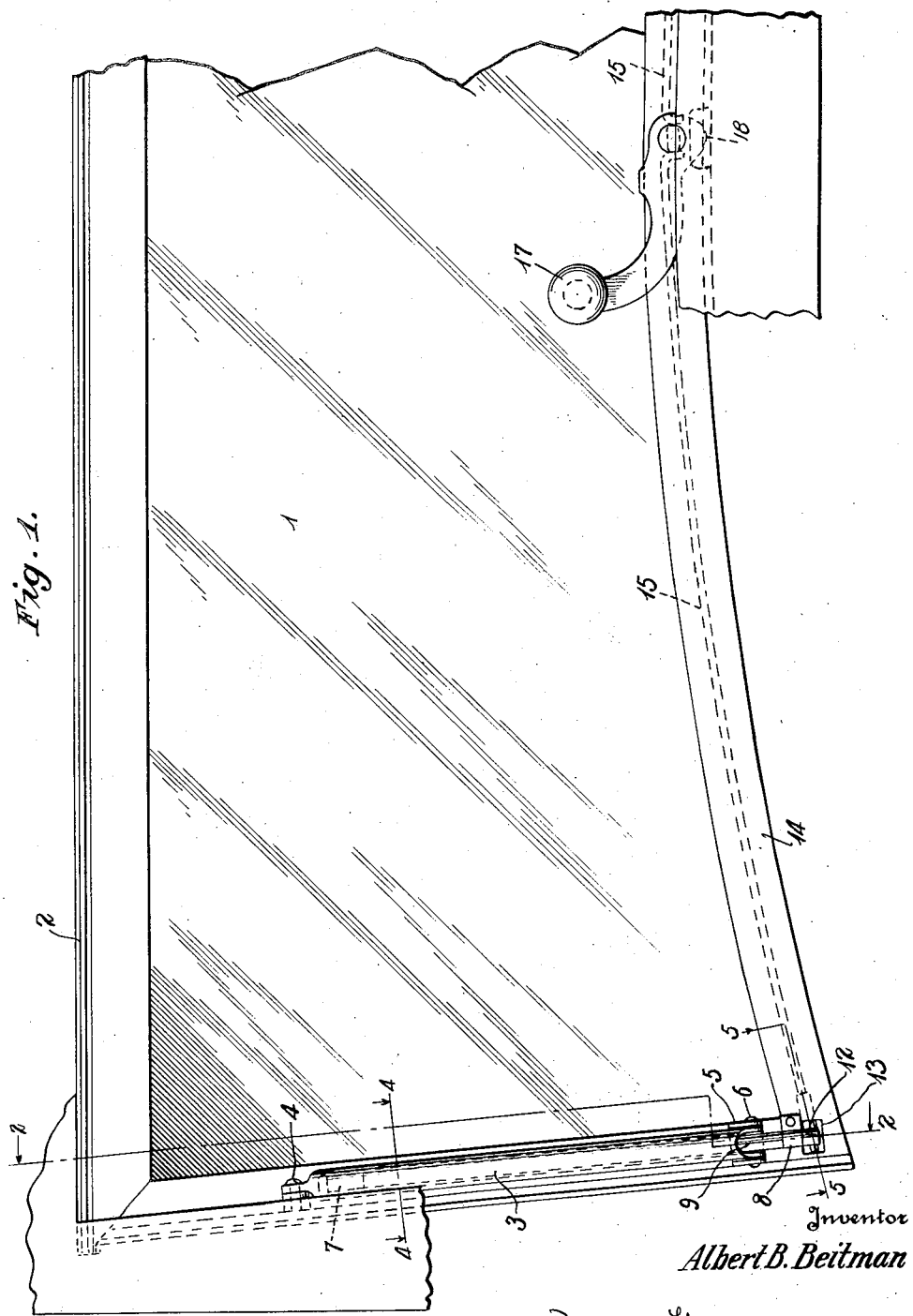
Inventor
Albert B. Beitman
By Bacon & Thomas
Attorneys Dec. 25, 1934.  A. B. BEITMAN  1,985,560
WINDSHIELD FOR AUTOMOBILES
Filed Nov. 13, 1931  2 Sheets-Sheet 2
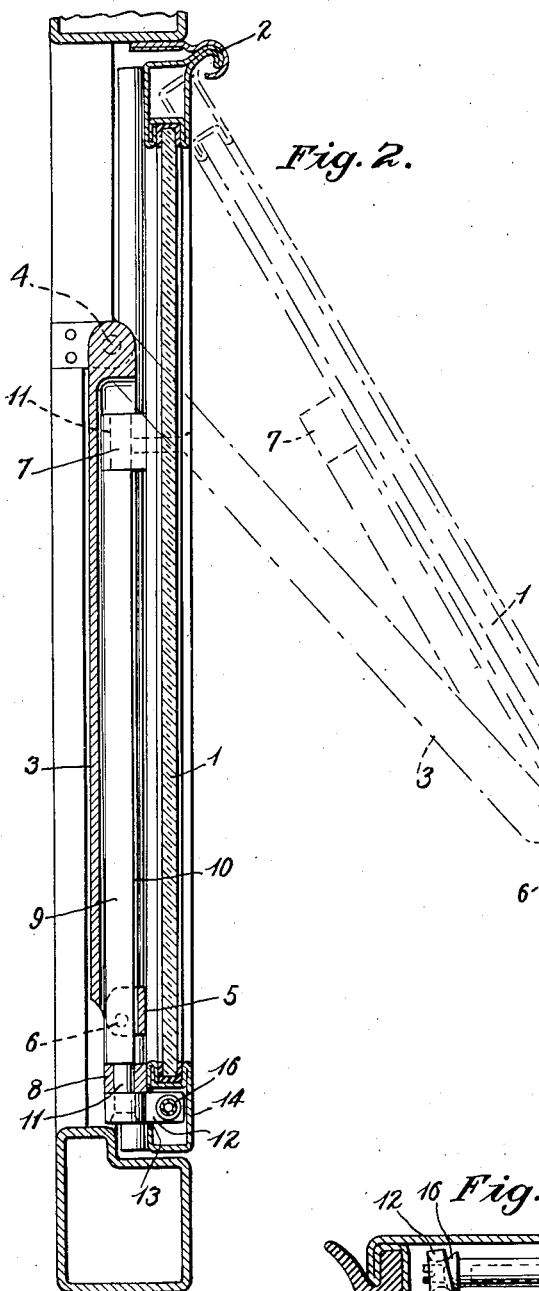
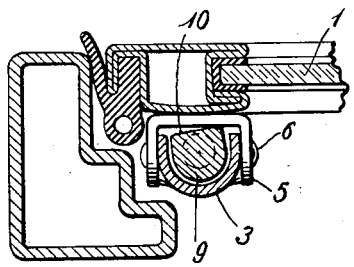
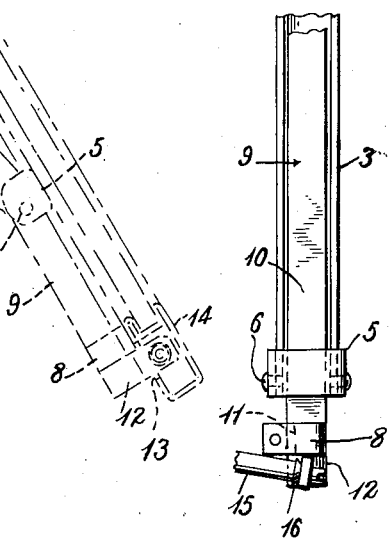
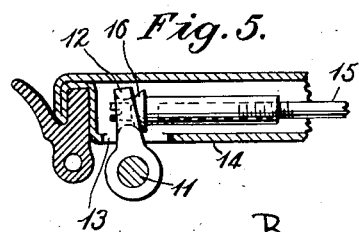
Inventor
Albert B. Beitman
By Bacon + Thomas
Attorneys Patented Dec. 25, 1934

1,985,560

UNITED STATES PATENT OFFICE 1,985,560

WINDSHIELD FOR AUTOMOBILES

Albert B. Beitman, Cleveland, Ohio

Application November 13, 1931, Serial No. 574,887

8 Claims. (Cl. 296—84)

This invention relates to windshields for automobiles and has particular reference to mechanism for securing the shield in any desired position of adjustment.

The invention has particularly for its object the provision of an inexpensive mechanism for camming the bracing rod relative to the swinging shield by the action of the conveniently located operating handle whereby one handle may be used to swing the shield and also to actuate the camming mechanism aforesaid.

Referring now particularly to the drawings:

Fig. 1 represents a front elevation of a windshield with my attachment applied thereto;

Fig. 2 is a sectional view taken on line 2—2 of Fig. 1;

Fig. 3 is a detail view of the camming mechanism I employ;

Fig. 4 is a sectional view of said camming mechanism taken on line 4—4 of Fig. 1; and Fig. 5 is a detail view of the means for actuating the camming mechanism taken on line 5—5 of Fig. 1.

Referring now particularly to the drawings wherein like reference numerals represent like parts, 1 is an automobile shield hinged to the windshield frame as at 2 and having one or more bracing arms 3. The upper extremity of the arm is fixedly hinged to the frame as at 4 while the lower end is provided with a sliding saddle 5 hinged thereto at 6. The bracing arm is of channel-shaped cross-section, and the saddle is of angular cross-section.

Positioned along the marginal edge portions of the shield and fixed thereto are upper and lower brackets 7 and 8 respectively. These brackets may be screwed to the windshield channel sash to firmly secure the same in non-rotative relationship therewith. An elongated vertically disposed cam is employed which is designated by reference numeral 9. This cam is irregular in cross-section and is preferably provided with a flat side 10. It has upper and lower reduced portions 11 which are rotatably journaled and fixed within the brackets 7 and 8. Secured to the lower reduced portion 11 is an operating finger 12 which extends inwardly through an aperture 13 provided in the windshield sash 14, at the inner corner of the lower portion thereof. This is clearly shown in Figs. 2 and 5. The lower channel sash of the windshield has an operating rod 15 which engages and is rockably fixed to said finger as shown at 16. The operating rods employed for the controls at opposite sides of the windshield are actuated by the handle 17 which is preferably positioned near the central portion of the shield and has a cam 18 which engages the adjacent ends of the rods. One or more of the operating rods and of the camming devices may be employed, but only one is shown for the purposes of this application.

A rotary movement of the handle 17 rocks the finger 12 and imparts a corresponding rocking movement of the elongated cam 9 with respect to the upper and lower brackets in which its reduced ends are journaled.

When it is desired to adjust the windshield, the handle 17 is moved from the position illustrated in Figure 1 to a position which will cause the rods 15 to move longitudinally away from each other. This movement will cause the fingers 12 carried by the lower ends of the cams 9 to be actuated for rotating these cams into positions where the flat sides 10 of the same are in parallelism with the flat back portions of the saddles 5. The saddles are then free to slide longitudinally of the cam members 9 and force applied to the handle 17 in the proper direction will cause the windshield to be moved outwardly or inwardly, as desired. After the windshield has been moved to its desired adjusted position, the handle 17 is returned to the position illustrated in Fig. 1, the cam members 9 will have been rotated into the position illustrated in Fig. 4 wherein one longitudinal edge of the flat side 10 will engage the inner surface of the flat back portion of the saddle 5 for frictionally wedging or binding the cam within the channel of the bracing arm 3 and against the saddle. This movement of the cams also will force the outer faces of the saddles into frictional engagement with the side sash members of the windshield. This camming or frictional binding action will retain the windshield in its desired position.

The constructon is quite inexpensive and can be constructed largely from stampings. While it relies upon friction, yet roughened portions can be provided on the under face of the saddle or on the front face of the cam or on both, whereby the frictional clamping action is increased by a more or less positive locking action.

Having thus described my invention, what I claim is:

1. In combination, an automobile windshield frame, a windshield mounted therein for swinging movement, bracing means cooperating with the windshield frame and the windshield, a cam mounted for rocking movement relative to the shield, said bracing means having a saddle slidable on and extending around the cam, and means for rotating said cam to frictionally bind said saddle against the side portion of the windshield.

2. In a motor vehicle, in combination, a windshield frame, a windshield hinged therein for outward and upward swinging movement, a channel-shaped bracing arm hinged at one end to said frame, a sliding saddle hinged at the other end of the bracing arm, an elongated rocking cam having a flat face, upper and lower brackets for receiving the said cam for journaling the same for rocking action relative to said saddle, a finger fixedly secured to said elongated cam, an operating rod journaled within the lower sash portion of the windshield, said rod being operatively associated with said finger, a handle for moving said rod and thereby rocking said cam into a position where its flat face binds against the sliding saddle and urges it into frictional engagement with the vertical sash portion of the shield where said bracing arm is prevented from a relative movement with respect to said shield to lock the shield in its desired position of adjustment, said channel-shaped arm being of larger cross-section than the cam whereby the cam fits within the channel-shaped arm when the windshield is in closed position.

3. In a motor vehicle, in combination, a windshield frame, a windshield hinged therein for outward and upward swinging movements, a bracing arm secured at one end to said frame, a pivoted saddle provided at the other end of said bracing arm, an elongated cam having a flat face, said saddle and bracing arm being slidable on said cam, means for supporting said cam for rocking action relative to said saddle, and means for rocking said cam into and out of frictional binding engagement with said saddle and said bracing arm whereby to secure the shield in any desired position of adjustment.

4. In a motor vehicle, in combination, a windshield frame, a windshield hinged therein for outward and upward swinging movements, bracing means associated with said frame, a U-shaped sliding element providing with the bracing means an opening, a rockable cam passing through said opening and fixedly securing said sliding element, and bracing means in any desired position of adjustment relative to said cam, and means for rocking said cam to bring the same into engagement with said slidable element and said bracing means.

5. In a motor vehicle, in combination, a windshield frame, windshield hinged therein for outward and upward swinging movements, a bracing arm hinged at one end to the frame, a sliding saddle pivoted to the other end of said bracing arm, a cam on which said saddle and bracing arm slide secured to the windshield and rockably supported with respect thereto, said cam being mounted within said saddle whereby rocking action of the cam binds the same against the sliding saddle and the bracing arm to fixedly secure the shield, and means for rocking said cam.

6. In a motor vehicle, in combination, a windshield frame, a windshield hinged therein for outward and upward swinging movement, a channeled bracing arm operatively connected to the frame and to the shield, a saddle pivoted to the bracing arm to traverse the channel thereof and movable in accordance with the movements of the shield, a cam locking device slidable in the channel and saddle and means for rotating said cam to prevent movement of the bracing arm when it is desired to fix the shield in any position of adjustment.

7. In a motor vehicle, in combination, a windshield frame, a windshield hinged therein for outward and upward swinging movement, a channel-shaped bracing arm hinged at one end to said frame, a pivoted saddle carried by the opposite end of said bracing arm, an elongated rocking cam housed within the channel of said arm when the windshield is closed, means for supporting said cam relative to the windshield, and means carried by the shield for engaging said elongated cam for rotating the same into engagement with the sliding saddle whereby to lock or unlock the shield in any desired position of adjustment.

8. In a motor vehicle, in combination, a windshield frame, a windshield hinged therein for outward and upward swinging movements, a channel-shaped bracing arm hinged at one end to said frame, an elongated rocking cam carried by and movable with said windshield, a saddle pivoted to the free end of said arm and straddling its channel to confine the cam in the channel of said free end, means for rotating said cam into engagement with said saddle to prevent further sliding action thereof, said channel-shaped arm being adapted to house the elongated cam when the shield is in closed position.

ALBERT B. BEITMAN.